US012793398B2

(12) United States Patent
Dey et al.

(10) Patent No.: US 12,793,398 B2
(45) Date of Patent: Nov. 10, 2026

(54) AUTOMATED DEFECT CLASSIFICATION AND DETECTION

(71) Applicant: IMEC VZW, Leuven (BE)

(72) Inventors: Bappaditya Dey, Heverlee (BE); Enrique Dehaerne, Leuven (BE); Sandip Halder, Bierbeek (BE)

(73) Assignee: Imec vzw, Leuven (BE)

( * ) Notice: Subject to any disclaimer, the term of this patent is extended or adjusted under 35 U.S.C. 154(b) by 342 days.

(21) Appl. No.: 18/304,508

(22) Filed: Apr. 21, 2023

(65) Prior Publication Data

US 2023/0343078 A1 Oct. 26, 2023

(30) Foreign Application Priority Data

Apr. 22, 2022 (EP) .................................... 22169598

(51) Int. Cl.

*G06V 10/776* (2022.01)
*G06V 10/70* (2022.01)
*G06V 10/77* (2022.01)
*G06V 10/82* (2022.01)

(52) U.S. Cl.

CPC ........ *G06V 10/776* (2022.01); *G06V 10/7715* (2022.01); *G06V 10/82* (2022.01); *G06V 10/87* (2022.01)

(58) Field of Classification Search

None

See application file for complete search history.

(56) References Cited

U.S. PATENT DOCUMENTS

| | | | | |
|---|---|---|---|---|
| 8,775,101 | B2 | 7/2014 | Huang et al. | |
| 10,436,720 | B2 * | 10/2019 | He | G06N 20/20 |
| 11,010,885 | B2 | 5/2021 | Brauer et al. | |
| 2018/0204111 | A1 * | 7/2018 | Zadeh | G06N 3/0464 |
| 2019/0073568 | A1 | 3/2019 | He et al. | |
| 2019/0147127 | A1 * | 5/2019 | Su | G03F 7/705 703/7 |
| 2019/0155164 | A1 | 5/2019 | Chen et al. | |
| 2023/0136110 | A1 * | 5/2023 | Theagarajan | G06N 5/022 706/45 |

(Continued)

OTHER PUBLICATIONS

Liu et al., "A Data-Flow Oriented Deep Ensemble Learning Method for Real-Time Surface Defect Inspection," IEEE Transactions on Instrumentation and Measurement, vol. 69, Issue: 7, Jul. 2020, published Dec. 9, 2019 (Year: 2019).*

(Continued)

*Primary Examiner* — Soo Shin

(74) *Attorney, Agent, or Firm* — McDonnell Boehnen Hulbert & Berghoff LLP

(57) ABSTRACT

The present disclosure related to a computer-implemented training and prediction method for defect detection, classification and segmentation in image data. The training method comprises providing an ensemble of learning structures, each learning structure comprising a feature extractor module, a region proposal module, a detection module, and a segmentation module. Each learning structure is trained individually and validated. Learning structures whose validation prediction score exceeds a predetermined threshold score are selected and their predictions combined, using a parametrized ensemble voting structure.

19 Claims, 4 Drawing Sheets

(56) References Cited

U.S. PATENT DOCUMENTS

2024/0054669 A1* 2/2024 Houben .................... G06T 7/13

OTHER PUBLICATIONS

Solovyev et al., "Weighted boxes fusion: Ensembling boxes from different object detection models," arXiv:1910.13302v3 [cs.CV], Feb. 6, 2021 (Year: 2021).*

Extended European Search Report and Written Opinion, Application No. EP 22169598.4, mailed Oct. 17, 2022, 12 pages.

Liu, Yuekai, Hongli Gao, Liang Guo, Aoping Qin, Canyu Cai, and Zhichao You. "A data-flow oriented deep ensemble learning method for real-time surface defect inspection." IEEE Transactions on Instrumentation and Measurement 69, No. 7 (2019): 4681-4691.

AdaBoost, Wikipedia, Anonymous, downloaded on Jan. 17, 2022 at URL https://web.archive.org/web/20190828120041/https://en.wikipedia.org/wiki/AdaBoost, 9 pages.

Dey, Bappaditya, Dipam Goswami, Sandip Halder, Kasem Khalil, Philippe Leray, and Magdy A. Bayoumi. "Deep learning-based defect classification and detection in SEM images." In Metrology, Inspection, and Process Control XXXVI, p. PC120530Y. SPIE, 2022.

Lin, Bing-Sheng, Jung-Syuan Cheng, Hsiang-Chou Liao, Ling-Wu Yang, Tahone Yang, and Kuang-Chao Chen. "Improvement of multi-lines bridge defect classification by hierarchical architecture in artificial intelligence automatic defect classification." IEEE Transactions on Semiconductor Manufacturing 34, No. 3 (2021): 346-351.

Dehaerne, Enrique, Bappaditya Dey, and Sandip Halder. "Ensemble deep learning-based defect classification and detection in sem images." Downloaded from URL https://learnopencv.com/ensemble-deep-learning-based-defect-classification-and-detection-in-sem-images/ (2022).

Patel, Dhruv V., Ravi Bonam, and Assad A. Oberai. "Deep learning-based detection, classification, and localization of defects in semiconductor processes." Journal of Micro/nanolithography, MEMS, and MOEMS 19, No. 2 (2020): 024801-024801.

Dehaerne, Enrique, Bappaditya Dey, and Sandip Halder. "Ensemble deep learning-based defect classification and detection in sem images." (2022).

Ren, Shaoqing, Kaiming He, Ross Girshick, and Jian Sun. "Faster r-cnn: Towards real-time object detection with region proposal networks." Advances in neural information processing systems 28 (2015).

He, Kaiming, Georgia Gkioxari, Piotr Dollár, and Ross Girshick. "Mask r-cnn." In Proceedings of the IEEE international conference on computer vision, pp. 2961-2969. 2017.

* cited by examiner

AUTOMATED DEFECT CLASSIFICATION AND DETECTION

CROSS-REFERENCE TO RELATED APPLICATIONS

The present application is a non-provisional patent application claiming priority to European Patent Application No. EP 22169598.4, filed Apr. 22, 2022, the contents of which are hereby incorporated by reference.

FIELD OF THE DISCLOSURE

The present disclosure relates to the field of automated object detection, classification and instance segmentation methods in image data relevant for machine vision applications. More particularly, the present disclosure relates to methods for automated detection, classification and segmentation of lithography defects in microscopy image data related to advanced semiconductor processing technologies.

BACKGROUND

Scaling in advanced semiconductor manufacturing processes has led to a continuous decrease in the size of semiconductor devices on a chip which, in turn, allows for denser designs. Complex multi-patterning and extreme UV lithography techniques have contributed to the successful scaling of semiconductor devices. The lithography steps are optimized to maximize yield. For example, required yields of 99.999% are not uncommon in each lithography step for the final semiconductor chip to be mass-manufactured in a profitable way. Therefore, the detection and study of lithography defects, for instance on patterned resist masks, is crucial throughout the whole process development stage and later ensures that quality control aims are met. The defects are generally detected in dedicated test structures, such as line patterns, that are provided for metrology and design verification purposes. While optical inspection of semiconductor defects is possible in some cases, the most commonly used defect inspection tools are based on scanning electron microscopes. A disadvantage of using electron beams in scanning electron microscopy (SEM) is that, in spite of the superior resolution and localization capability, the resulting microscopy images are noisier than their optical counterparts, which makes repeatable and accurate defect detection and classification more difficult to achieve in SEM-based metrology measurements. This is particularly true in high numerical aperture (high-NA) applications, where an aggressive pitch (e.g. line spacing) and a thin resist are used. For a better understanding of the root causes for the formation of semiconductor defects during lithography, the defects need not only to be detected with high confidence, but require accurate localization and reliable classification. Ideally, the three-fold goal of defect detection, localization and classification in SEM images is obtained in an automated manner, without the resource- and time-inefficient intervention of an expert operator that decides on image contrast and sets adequate detection thresholds manually. Yet, automating the defect detection, localization and classification is a challenging task since defect patterns like line-bridges, line-gaps and line-collapses typically arise in the micro-scale or nano-scale range and have varying spatial extent, e.g. in terms of pixel-widths.

Current inspection tools use rule-based defect detection and classification methods, which do not reliably detect all the defects and depend critically on the level of expertise of the person trained to operate these tools.

It is desirable to detect defects early as this helps reducing engineering time and the tool cycle time associated with the defect inspection process.

Patel et al. in "Deep learning-based detection, classification, and localization of defects in semiconductor processes," J. Micro/Nanolith. MEMS MOEMS, 19(2), 2020, disclose an automated method of localizing and classifying lithography defects of semiconductor processes in images delivered by an electron beam inspection tool. Deep-learning with convolutional neural networks is used to train a neural network model to distinguish between defect free electron beam images, electron beam images showing single line breaks and electron beam images with multiple line breaks. A softmax classifier has been applied to a fully connected layer or a global average pooling (GAP) layer as the final layer of the deep neural network's layer stack. Defect localization has been obtained in an unsupervised manner through the generation of class activation maps from the GAP layer. This work does not address the issue of having multiple defect instances in the same image and the defect localization remains dependent on the threshold level set by the user in respect of the contour levels that define the defect boundaries in the generated heatmaps.

He et al., U.S. patent application No. 2019/0073568 A1 filed on Mar. 7, 2019, relates to defect detection and automated defect classification in the context of semiconductor fabrication processes. Optical or electron beam images are analysed by a neural network that comprises a feature extracting, first portion and a second portion for detecting defects in the input images based on the features extracted by the first portion and for classifying the detected defects. Bounding boxes are predicted to localize the defects in the input images, but do not allow instance segmentation thereof.

It may be desirable to extract related parameters, such as area, length and width, from correctly detected and classified defects so that a better understanding of the root causes for the defects can be gained.

SUMMARY

The present disclosure provides for a reduction in the engineering time and the tool cycle time associated with defect localization, classification and segmentation in semiconductor inspection processes.

In an example embodiment, a computer-implemented training method for defect detection, classification and segmentation in image data is disclosed. The example method comprises the steps of:

a) providing an ensemble of learning structures, each learning structure comprising a feature extractor module adapted to generate a feature map from an input image, a region proposal module adapted to identify regions of interest in the input image based on the generated feature map, a detection module adapted to detect defects in each one of the identified regions of interest in the input image and to predict a defect class and defect location associated with each one of the detected defects, and a segmentation module adapted to predict an instance segmentation mask for each detected and classified defect in each one of the identified regions of interest in the input image, wherein each feature extractor module comprises a convolutional neural network;

b) individually training each learning structure of said ensemble with a set of training images from an image dataset, wherein images of the image dataset comprise ground truth class labels and ground truth locations in respect of defects contained therein, and at least a subset of the training images comprises ground truth instance segmentation labels in respect of defects contained therein;

c) validating each learning structure of said ensemble with a set of validation images from the image dataset to obtain a prediction score for each learning structure and selecting the learning structures of said ensemble of learning structures whose prediction score exceeds a predetermined threshold score; and d) combining predictions from the selected learning structures of the ensemble of leaning structures, using a parametrized ensemble voting structure, wherein parameters of the ensemble voting structure are optimized on the set of validation images.

Providing an accurate prediction of the segmentation mask of each defect instance of an input image greatly reduces the time needed to manually label defect masks or relabel low-quality defect masks provided by conventional tools. The accurate prediction of the segmentation mask further reduces the time needed to the review time for experts study, qualify and quantify the defects of semiconductor manufacturing process. The accurate prediction of the segmentation mask further reduces the engineering time to reach a stable semiconductor manufacturing process in which defects are well understood and their yield impact on the final product minimized.

The example embodiments provide a mechanism for accurate prediction of the segmentation mask of each defect instance of an input image which alleviates the need to train machine learning models to achieve a high level of confidence on the location prediction of defects.

In an example embodiments, a web-based application such as a client-server application is provided in which a software executes a machine learning model that has been trained with the inventive training method of the first aspect.

In an example embodiment, an inspection system for detecting and classifying lithography defects in resist masks of a semiconductor device under test is disclosed. The inspection system comprises an imaging apparatus, such as a scanning electron microscope, and a processing unit. The processing unit is configured to receive image data relating to the resist mask of the semiconductor device under test from the imaging apparatus, and is programmed to execute the training method as disclosed.

In an example embodiment a data processing device that comprises a processor configured to perform the training method is disclosed.

In an example embodiment a computer program that comprises instructions which, when the program is executed by a computer, cause the computer to carry out the training method is disclosed.

Particular aspects of the disclosure are set out in the accompanying independent and dependent claims.

The above and other aspects of the disclosure will be apparent from and elucidated with reference to the embodiment(s) described hereinafter.

BRIEF DESCRIPTION OF THE DRAWINGS

The present disclosure will now be described further, by way of example, with reference to the accompanying drawings, in which.

Figure 1:
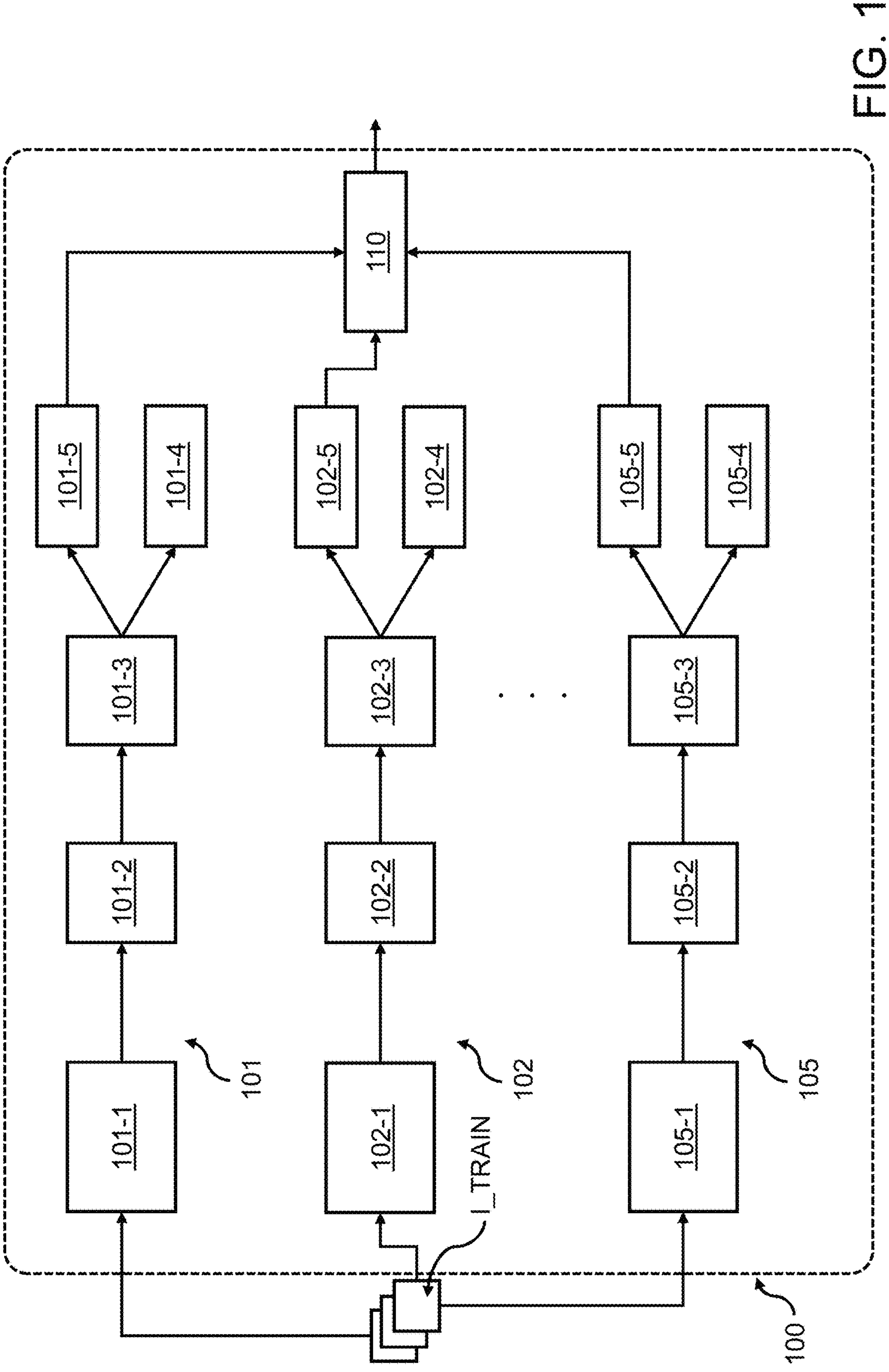
FIG. 1 illustrates the architecture of a machine learning model that can be used according to the disclosed embodiments.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

DETAILED DESCRIPTION

The present disclosure includes and describes particular embodiments and with reference to certain drawings but the subject matter of the disclosure is not limited to this disclosure but only by the claims.

As used herein the term “comprising”, used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression “a device comprising means A and B” should not be limited to devices consisting only of components A and B. It means that with respect to the present invention, the only relevant components of the device are A and B.

Reference throughout this specification to “one embodiment” or “an embodiment” means that a particular feature, structure or characteristic described in connection with the embodiment is included in at least one embodiment of the disclosed subject matter. Thus, appearances of the phrases “in one embodiment” or “in an embodiment” in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features are sometimes grouped together in a single embodiment, figure, or description thereof for the purpose of streamlining the disclosure and aiding in the understanding of the disclosure. This method of disclosure, however, is not to be interpreted as reflecting an intention that the claimed invention requires more features than are expressly recited in each claim. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the disclosed subject matter, and form different embodiments, as would be understood by those in the art. For example, in the following claims, any of the claimed embodiments can be used in any combination.

It should be noted that the use of particular terminology when describing certain features or aspects of the disclosed subject matter should not be taken to imply that the terminology is being re-defined herein to be restricted to include any specific characteristics of the features or aspects of the invention with which that terminology is associated.

In the description provided herein, numerous specific details are set forth. However, it is understood that example embodiments may be practiced without these specific details. In other instances, well-known methods, structures and techniques have not been shown in detail in order not to obscure an understanding of this description.

In one example embodiment, a computer-implemented training and prediction method for the classification, localization and instance segmentation of defects in image data is disclosed. The training and prediction method use a machine learning model.

With reference to FIG. 1, a machine learning model is now described, which can be used to localize, classify and segment lithography defects after a resist or etch step in a semiconductor manufacturing process. The machine learning model 100 may comprise an ensemble of learning structures 101 through 105, referred to as first stage learners, and an ensemble voting structure 110, referred to as the second stage learner. Although an ensemble consisting of five learning structures is shown in this example embodiment, the ensemble may contain a smaller or larger number of learning structures.

Figure 6:
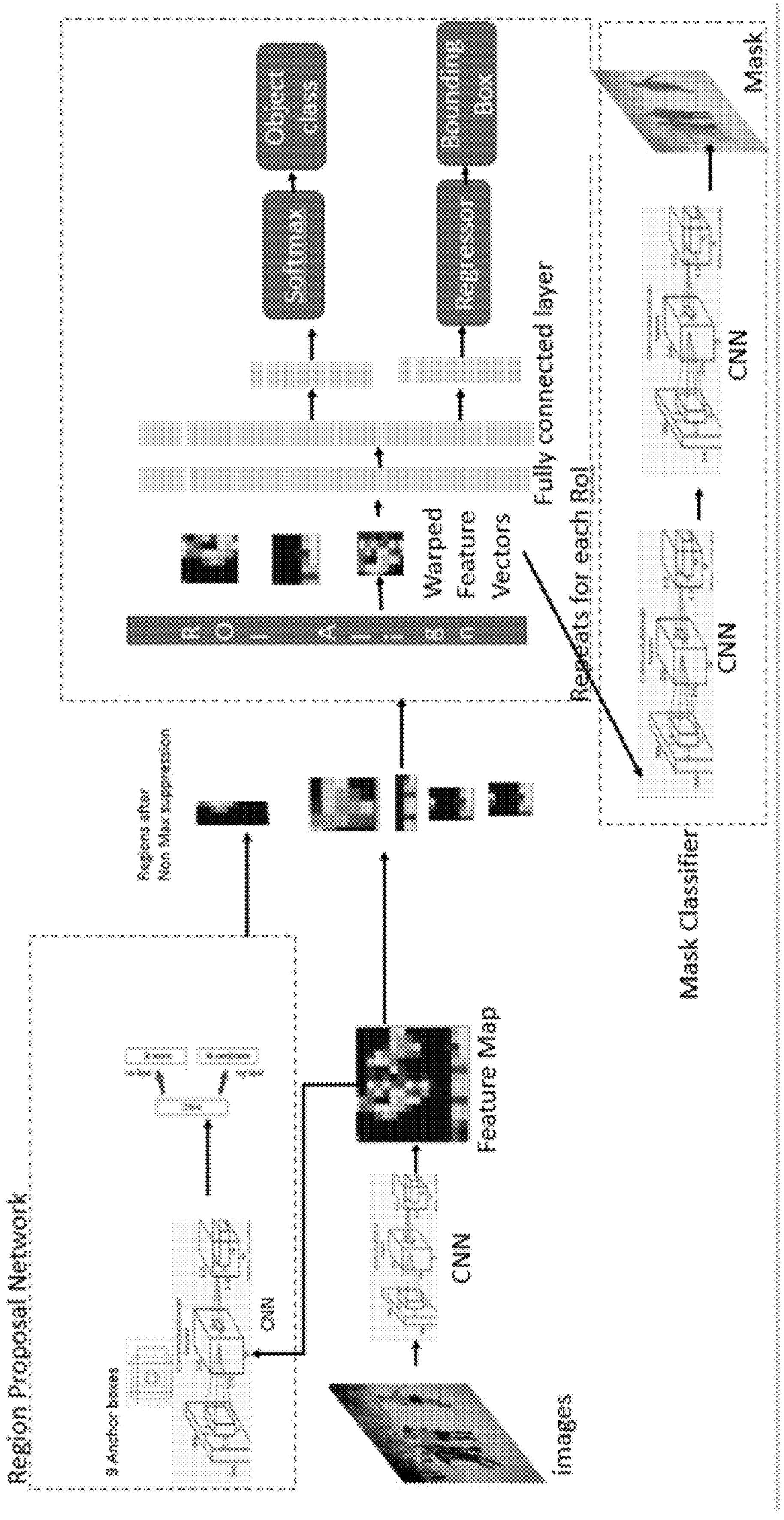
FIG. 6 illustrates is a detailed view the architecture of one of the learning structures according to the disclosed embodiments.

The first stage learners are structured similarly and include the same type of modules. More specifically, each first stage learner contains a feature extractor module, e.g. a subnetwork acting as deep feature extractor, a region proposal module, and a region pooling or region align module. A detection module and a segmentation module, e.g. a module that is adapted to generate a pixel mask for each detected instance, are provided as separate branches of the respective first stage learner. For instance, in the machine learning model 100, the learning structure 101 includes a feature extractor 101-1, a region proposal module 101-2, a region align module 101-3, a segmentation/instance mask generation module 101-4 and a detection module 101-5. Similarly, learning structure 102 includes a feature extractor 102-1, a region proposal module 102-2, a region align module 102-3, a segmentation module 102-4 and a detection module 102-5, and so forth. Typically, the individual modules may be designed differently in the different learning structures so that each learning structure of the ensemble is trained independently from the others and learns to generalize in a way that differs from the others. A more detailed implementation of a learning structure, which is based on the Mask-R-CNN architecture, is depicted in FIG. 6 of the drawings.

The feature extractor module, e.g. deep feature extractor network, corresponds to the subnetwork or backbone of the first stage learner that generates a feature map over the entire input image. In general, the feature extractor module contains a plurality of stacked convolutional layers and may include one or more (max) pooling layers, residual blocks, skip connections, activation functions such as ReLu operations, and other functional blocks or layers known in the art. In some example embodiments, each first level learning structure may use a different feature extractor. By way of example, learning structure 101 may provide a portion or all of the ResNet50 architecture as the feature extractor module 101-1, learning structure 102 may provide a portion or all of the VGG architecture as the feature extractor module 102-1, yet another learning structure may provide a portion or all of ResNet101 architecture as the feature extractor module. It should be understood that any one of the learning structures can be instantiated with a different feature extractor during training and the number of learning structures may be varied and optimized during training, e.g. the parameters of the meta-machine learning model are determined through model selection. A non-exhaustive list of feature extractors include the non-dense portion of the following architectures: ResNet50, ResNet101, ResNet152, SSD_MobileNet_v1, SeResNet34, AlexNet, VGG16, VGG19, ZF net, GoogleNet, ImageNet, YoloV5 (YoloV5n, YoloV5s, YoloV5m, YoloV51). Here, the non-dense portion of a network refers to all the layers (convolutional, pooling) that precede the first fully connected layer of the respective network.

The region proposal modules are adapted to output a collection of regions of interest, based on the feature map of the respective feature extractor module as input. In other words, the region proposal modules act directly on the feature maps generated by the extractors. This has the advantage that the inference and training phases are sped up significantly compared to conventional region selection algorithms such as selective search, and sliding window algorithms.

As proposed by the authors of Faster R-CNN in Ren S, He K, Girshick R, Sun J.: "Faster R-CNN: Towards Real-Time Object Detection with Region Proposal Networks", IEEE Trans Pattern Anal Mach Intell. 2017; 39(6):1137-1149, the region proposal network may comprise a convolutional layer, followed by at least one fully connected layer and branches for bounding box regression of candidate objects and objectness classification. Anchor boxes with different aspect ratios and size scales may be associated with each grid point of the last convolutional layer of the region proposal network. In some embodiments, a feature pyramid network (FPN) may be used instead, in which each level of the pyramid is associated with a different size scale of the anchor boxes, but still includes different aspect ratios. The bottom-up part of the FPN typically corresponds to coarser and coarser layers of the feature extractor module, but may also be implemented as independent structure, whereas each level of the top-down part of the FPN includes lateral prediction branches for objectness classification and bounding box regression. Here, objectness classification relates to the classification of the content in the anchor boxes as foreground objects or as background. In the specific context of defect detection and classification, the foreground objects correspond to the different kind of defects that can be expected from and/or have been observed in the images of the training set.

The objectness classifier and the bound box regressor associated with each anchor may be configured to distinguish, by supervised learning, foreground objects from the image background and to align and size a bounding box associated with the objects classified as foreground objects. Non-maximum suppression (NMS) may be applied to reduce the number of proposals and only a predetermined number of top-ranked proposals (by objectness classification score) may be used as inputs to the respective region pooling module.

The region pooling modules may be configured to generate fixed-size feature vectors for each region of interest proposed by the corresponding region proposal modules, e.g. by applying max pooling. The fixed-sized feature vectors may be applied to the segmentation module and detection module of the respective first stage learner. In some example embodiments which rely on region align modules, the max-pooling step may be preceded by an upsampling and bilinear interpolation operation in order to prevent loss of information.

The detection module generally comprises one or more fully connected layers, followed by a multi-class classifier branch, e.g. softmax classifier, and a bounding box regressor branch. The class-dependent bounding box regressor of the detection module is distinct from the bounding box regressor of the region proposal network, although it accepts the bounding boxes of the region proposal module as inputs for further refinement. The detection module may be tasked to refine and accurately predict the bounding boxes of defects that are contained in the region of interests, e.g. candidate regions, as proposed by the region proposal network. The detection of false positives may be reduced as a result of training, during which the learning structures are presented with the ground truth class labels and locations of the defects in each training image.

Figure 4:
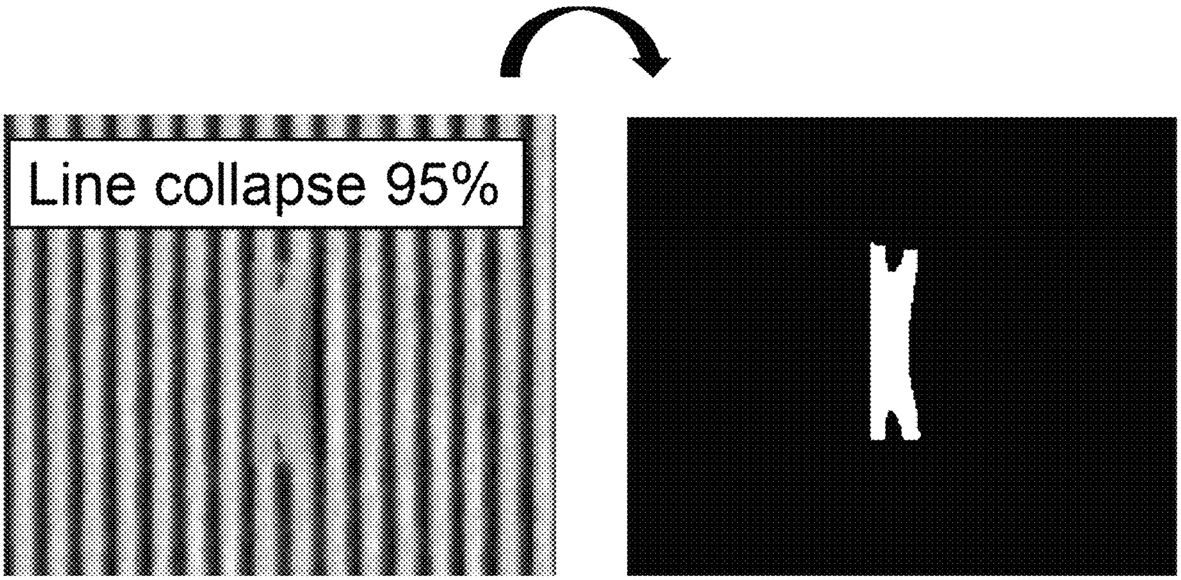

The segmentation module may correspond to the mask branch implementation described by the authors of Mask-R-CNN, in particular in section 3 and FIG. 4 of He, Kaiming, et al. "Mask R-CNN", 2018, arXiv preprint arXiv: 1703.06870. The segmentation module and the corresponding mask branch implementation may contain an alignment layer for the fixed-size feature vector and a stack of convolutional and deconvolutional layers. The output of the last layer of this stack may be subjected to a pixel-wise sigmoid for the detected, e.g. the identified or otherwise most probable, defect class, resulting in a binary segmentation mask for the detected defect class. It will be understood that variations of the segmentation module may be implemented or different segmentation algorithms executed by the segmentation module.

The ensemble voting structure 110 may be connected to the outputs of the detection modules of a subset of learning structure. This subset may be selected based on prediction scores obtained by the individual leaning structures during model validation. The ensemble voting structure may be configured to combine predictions about the defect class and defect location into a final prediction for the defect class and defect location. One way to combine the predictions about the defect class and defect location will be described further below.

FIG. 1 describes the method of training the machine learning model. A training set of image data, I_TRAIN, is received at the respective inputs of the first stage learners. This training set of images may be part of a larger dataset of images, e.g. images obtained by an inspection tool, e.g. SEM images, which may also contains a validation set and a test set. In some embodiments, each image of the training set comprises one or more semiconductor defect, e.g. lithography defects in a resist mask or etch mask of the semiconductor device or structure under test, although it is possible to include defect-free images into the training set. Images of the validation and test set may include defect-free images as well as images with one or more defects. A ground truth label for the defect class may be associated with each defect instance in images of the dataset, together with a ground truth labelling for the segmentation mask. This ground truth labelling may correspond to a binary pixel mask or a boundary of the pixel mask, e.g. a definition of a polygon. Additionally, information on the ground truth defect location, e.g. a bounding box, may be assigned to the defect instances contained in at least some of the images of the dataset. The ground truth labels and location information may be used to steer the ensemble of learning structures towards better predictions on the defect locations, classes and segmentation masks, e.g. to provide reinforcing feedback during multi-task learning by the ensemble of learning structures of the machine learning model as long as deviations between the predictions about defect location, class and segmentation mask and the corresponding ground truth labels/location information persist in images of the training set.

Figure 2:
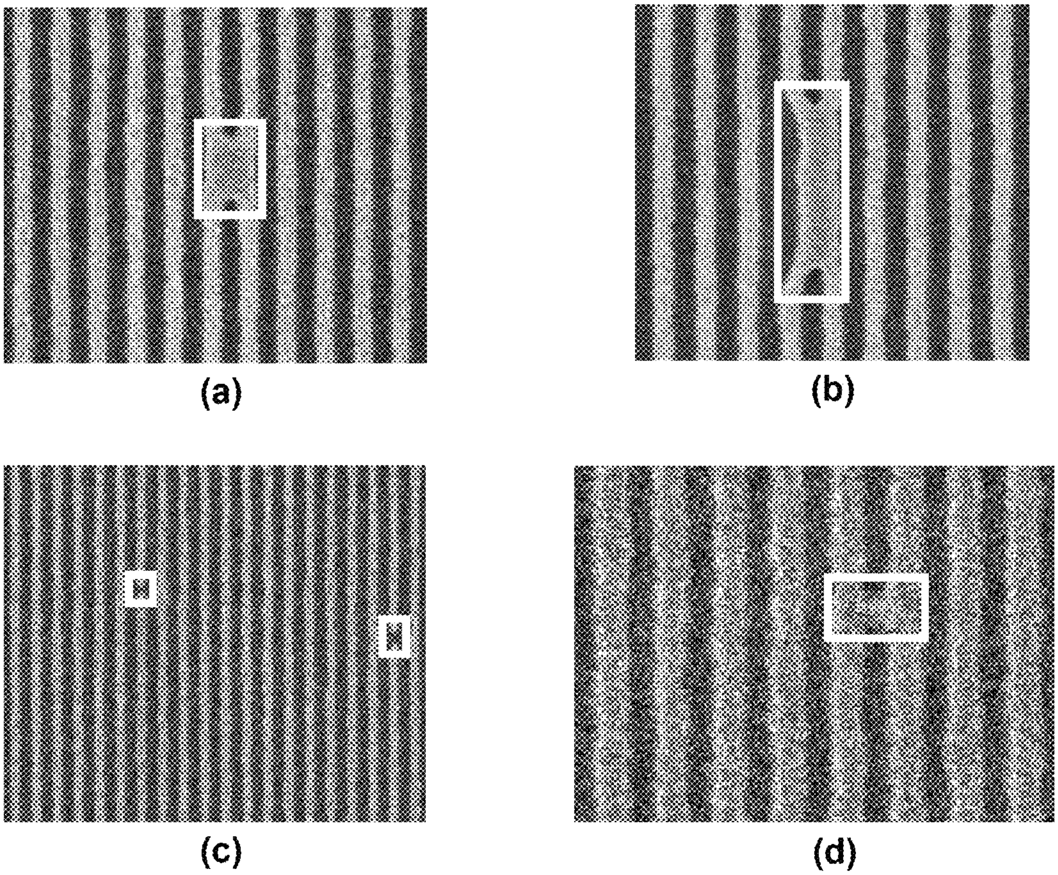
FIG. 2 illustrates four example images of a training set that can be used to train the machine learning model depicted in FIG. 1.

FIG. 2 shows four example images of an exemplary training set, each containing at least one defect. In each of the four example images, the respective defect may be annotated by ground truth labels (not shown in the figure) corresponding to and also localizing the defect in the image. Additionally, a bounding box (shown in the figure) can be drawn around the defect to act as ground truth information on the defect location. The complete dataset for training, validation and testing of the machine learning model may consist of 1324 labelled images, but can be extended and/or quality-improved over time. The image data in the dataset relates to SEM raw images (1024 pixels×1024 pixels) of line patterns (32 nm pitch) on a photolithographically exposed resist wafer. In some example embodiments, the images of the dataset are typically gray-scale images and the defect class labels, bounding boxes and segmentation labels have been obtained through manual labelling of the images by experts. Defects are distributed stochastically on the test structures undergoing SEM inspection, i.e. defect classes, locations and defect features such as area, length, pixel distribution are distributed randomly. The complete dataset has been split into a dataset for training (e.g. 1053 images including 2529 defect instances distributed over 5 defect classes), a dataset for model validation (e.g. 117 images including 337 defect instances distributed over the 5 defect classes) and a dataset for testing (e.g. 154 images including 399 defect instances distributed over the 5 defect classes). As illustrated in FIG. 2, the first example image (a) shows a line-bridge defect, the second example image (b) shows a line-collapse defect, the third example image (c) shows two line-gap or line-break defects, and the fourth example image (d) shows a micro-bridge defect. The fifth defect type for classification is given by probable nano-gaps, i.e. regions that do not yet qualify as a fully developed defect but are very likely to develop into a defect as the result of a subsequent manufacturing step. This division of defects into classes is not limiting. Composition of defects may be considered as a new type of defect to be classified at least for some applications, for instance multi-bridge defects. New types of defects may be included into a more comprehensive dataset and the machine learning model retrained with respect to the more comprehensive dataset. Accordingly, in some example embodiments, the computer-implemented method may be configured for different applications, or extended to address more challenging or complex defect analysis tasks. Additional defect types to be classified could also include resist footings (false or non-permanent bridge in the sense that resist footings appear during the lithography process due to incomplete resist removal, e.g. between two lines of the pattern, and vanishes during the next etch process), multi-bridge defects, micro-gaps, and nano-gaps. Furthermore, a refined classification depending on the horizontal or non-horizontal character of the defect (in vertical line patterns) is possible. Defect types to be detected, classified and segmented may include defects occurring on different length scales, e.g. microscale and nanoscale, in different dimensions, e.g. defects relating to zero-dimensional patterns (e.g. study of defective holes, for instance for contact hole formation), one-dimensional patterns (e.g. line defects) or two-dimensional patterns (e.g. corner defects, angle deformations, etc.). The classification problem to be solved by the machine learning model is thus a multi-class problem.

The feature extraction modules of each learning structure may operate on the entire input image of the training set that has been currently applied to the machine learning model. In general, several input images may be applied concurrently as a minibatch of training data, but the method may be performed in respect of individually applied images. During the forward pass, the convolutional layers of the feature extraction modules generate a feature map for the applied input image of the training set. The region proposal module acts directly on the generated feature map. The region proposal module generates anchor boxes of different scales and aspect ratios in each point of the feature map. A bounding box regressor may be trained to accurately predict the bounding box dimensions and offsets of the proposed region of interest from the bundle of anchor boxes associated with each scale factor and with each point in the feature map. Region proposal modules of this type have been described in the framework of the Faster R-CNN. As mentioned previously, the region proposal module may comprise a feature pyramid network to generate anchor boxes of different scales on the different levels of the feature pyramid.

The size of the feature map depends on the number of convolutional layers, their stride and the use of pooling layers after one or more of the convolutional layers. During model validation, the architectural parameters of the feature extractor module can be changed, e.g. by using a different subnetwork architecture (e.g. ResNet50 instead of VGG-16), a different number of convolutional and/or pooling layers, different stride parameters, etc. By way of example, the feature extractor module may be modified or substituted if a validation performance metric, e.g. a per-class average precision score or a mean average precision score (over all classes) is smaller than a predetermined threshold score at the end of the training phase. The presence of the region proposal network and the region pooling layer or region align layer ensures that a fixed-size feature vector (warped feature vector for region align layer) may be extracted from each region of interest in the feature map.

The detection module then determines the class label or class probability as well as the corresponding bounding box for each defect present in the region of interests proposed by the region proposal network for a given input image of the image dataset. Defect-free images only contain background objects that are not forwarded by the region proposal network.

A subset of learning structures is selected thereafter, wherein selection is based on the validation scores obtained by each learning structure during model validation. If the validation score of a particular learning structure exceeds a predetermined threshold, this learning structure is selected to act as an input for the ensemble voting structure. The validation score on which the selection process is preformed may be the mean average precision computed over all defect classes, or may be the average precision in respect of a specific defect class.

In some example embodiments, the subset of learning structures after the selection step can still be identical to the original set of learning structures, e.g. all the learning structures of the ensemble are selected. This may happen if the predetermined threshold for selection is defined low enough to allow selection of all the learning structures of the ensemble, e.g. when setting the threshold to zero or close to zero. Even though the selection step may not lead to an immediate pruning of the machine learning model, the following ensemble voting structure may still assign optimized weights (binary or multi-digit precision) to each learning structure of the ensemble that may justify discarding a particular learning structure if the assigned weight is small, e.g. a zero-valued weight that effectively removes the learning structure from the ensemble voting structure or a weight that falls below a precision threshold, e.g. during model compression, similarly disconnecting the learning structure from the ensemble voting structure.

The ensemble voting structure may then generate optimized, single predictions about the defect classes and defect locations in the images of the validation dataset, using the individual prediction of the selected learning structures as inputs. In some example embodiments, the ensemble voting structure may be configured to perform an affirmative, weighted average voting scheme, where all defects detected by all the selected learning structures are retained (logical OR operator acting on the set of defect locations) and their weighted class probabilities averaged. For the purpose of ensemble voting, two leaners may be considered to have predicted a defect at the same location, regardless of the predicted defect classes, if their bounding boxes overlap by a predetermined amount, e.g. having an intersection-over-union (IoU) score larger than a predetermined value, e.g. IoU>0.5. In practice, the distinct defect locations of those learning structures whose defect class prediction is the most confident, e.g. has achieved the highest score in class probability, are started with and then the overlap with each one of the bounding boxes pertaining to the less confident learning structures may be computed to decide whether the defect location predicted by the less confident learning structure may be considered as the identical (e.g. IoU score larger than 0.5) or a separate defect location (e.g. IoU smaller or equal to 0.5). The order in which the bounding boxes from the less confident learning structures are overlapped with the bounding box of the most confident learning structure may be according to a descending level of confidence.

The weighting parameters for the ensemble voting can be learnt by a boosting algorithm or determined by a search algorithm, e.g. grid search. Optimization of the weights may be performed in respect of a preselected final validation metric for the ensemble voting structure, e.g. mean average precision (mAP) over all the defect classes. A final class label may be assigned based on the weighted average. Furthermore, the ensemble voting structure may be configured to also combine the defect location prediction of the selected learning structures. Weighted box fusion can be applied to merge the bounding box predictions of selected learning structures predicting the same defect class. The merged bounding box corresponding to the class label assigned by the ensemble voting structure may be output as a final prediction about the defect location.

Although affirmative voting has been used in one embodiment described, other voting schemes may be implemented. For instance, consensus voting or unanimous voting may be implemented, both having the potential to eliminate defects at locations that were detected by some, but not all the first stage learners. More precisely, unanimous voting operates as a logical AND operator acting on the det of detected defect locations, meaning that a defect location is retained by the ensemble voting structure only if all the first stage learners have predicted this location (within the permitted bounding box overlap region). Consensus voting is situated between the affirmative and the consensus voting scheme and only admits defect locations that have been detected/predicted by the majority of the selected learning structures. In the case that not all the defect locations predicted by the selected learning structures are retained, the weighted average of predicted class probabilities is performed only in respect of the retained defect locations. The weighted average may be performed on any metric that is adequate to reflect a defect class prediction. For instance, the defect class probabilities of the top-ranked defect class may be weighted and averaged across the selected learning structures, the defect class probabilities of the K highest ranked defect classes may be weighted and averaged, for each rank k=1, . . . , K independently, across the selected learning structures, or one-hot-vectors for the defect class prediction at each retained defect location can be weighted and averaged across the selected learning structures.

The segmentation module may determine the binary segmentation mask for each localized defect present in the region of interests proposed by the region proposal network for a given input image of the image dataset. In some embodiments, only the binary segmentation of the selected learning structure with the most confident defect class prediction that matches the final defect class prediction by the ensemble voting structure may be output.

The first stage learners may be trained by a stochastic gradient descent algorithm, the Adams optimizer, or other suitable training algorithms known in the field of deep learning. The learning rate may be relaxed and dropout may be used for regularization during training. Training passes may use minibatches of training images. Cross-validation may be implemented.

A loss function used during training, validation and testing of the machine learning module includes contributions from the bounding box regressor and the classifier of the detection module, e.g. penalizing bounding box misalignment and wrong sizing of the predicted bounding box relative to the ground truth bounding box as well as wrongfully classified defects relative to the ground truth class labels. Moreover, the loss function may include a contribution of the segmentation module which accounts for any deviation of the predicted segmented instance mask from the ground truth pixel mask. In some embodiments, the contribution of the segmentation module to the loss function of each learning structure may be weighted more heavily relative to the contribution from the bounding box regressor. Accordingly, the regression for the segmentation mask actively guides the correct alignment of the bounding boxes predicted by the bounding box regressor of the detection module. It also leads to a trained machine learning module in which the defect class predictions and defect segmentations masks are typically more accurate than the predicted bounding boxes. The increased accuracy may be utilized in embodiments that focus on the segmentation and classification task. In fact, missing ground truth information for the defect locations in some images of the dataset can be substituted by a bounding box that is derivable directly from the segmentation mask, e.g. as the convex hull (polygon shape) or the smallest rectangle enclosing the convex hull of a segmented defect mask. Therefore, in some example embodiments missing or incomplete ground truth information in respect to defect locations in the images of the image dataset can be complemented during training, which also improves the effectiveness of the region proposal module in proposing well-aligned regions of interest.

In general, training of the first stage learners stops after a predetermined number of training passes (epochs), or may be stopped early if the validation error has settled or may be fluctuating about a constant value. Model validation may be performed with respect to the validation part of the dataset and may be performed after a predetermined number of training epochs, e.g. a predetermined number of backpropagation passes, e.g. after every 1000 epochs or less, e.g. after every 100 epochs or less, e.g. after 30 epochs or less, e.g. after 10 epochs or less, e.g. after each epoch.

Optionally, input images of the image dataset are subjected to a denoising stage prior to being applied to the machine learning model. Furthermore, in some example embodiments, the overall size of the dataset is relatively small, e.g. a few thousand images, or reliable expert labelling is difficult to obtain, e.g. very time-intensive, it can be advantageous to augment the size and the diversity of the training, validation and/or test set by applying data-augmentation techniques such as input image rotation, translation, shearing, scaling, or flipping (vertically and/or horizontally). These data-augmentation techniques can also be used to provide a more balanced dataset with respect to the different defect classes, i.e. balance the number of per-class defects across the different classes. Other embodiments of the invention, not described in further detail, may provide synthetic input images (e.g. simulated defects in SEM images) as a way to increase the size of the dataset.

In some example embodiments, soft pixel labels for the instance segmentation masks may be obtained and assigned to images of the training set that previously were lacking ground truth segmentation labels. The soft pixel mask labels, in this case, correspond to the outputs of the segmentation module from the most confident learning structure.

Numerous variants of the above-described computer-implemented training method for the machine learning model may be possible and sometimes even desirable.

For instance, it can prove useful to notify a user if none of the learning structures of the ensemble of learning structures has been selected for the subsequent ensemble voting. This allows a machine learning engineer to supervise the training of the model and intervene or change hyperparameters when the training results are not satisfactory. Alternatively, such a notification may be suppressed and dealt with in an automated fashion by the computer method itself.

Alternatively or additionally, the computer-implemented method may recommend a user to provide a larger set of training images and/or improve at least one of the ground truth class labels, the ground truth locations and the ground truth instance segmentation labels in respect of defects contained in the images of the image dataset, provided that the prediction score is above the predetermined threshold score and below a predetermined target score. This recommendation is of importance in data-centric approaches, according to which machine learning engineers strive for an ever improving dataset, more than trying to develop improved machine learning models, as a way to improve prediction performance. The proposed method is thus capable of notifying the user of potential shortcomings or weaknesses in the underlying dataset, thus allowing the collection of new images or the re-labelling of defect classes, locations and segmentation masks with the goal of retraining the current model with data of higher quality. Class imbalance issues may be notified in a similar fashion.

During the test phase, the trained and validated machine learning model may be used for inference. One or more test images may be applied to the selected learning structures and the ensemble voting structure generates predictions on the defect classes and corresponding defect locations in the test images. The segmentation modules of the selected learning structure associated with the most confident defect class prediction may be used to generate the binary pixel mask for instance segmentation.

Figure 3:
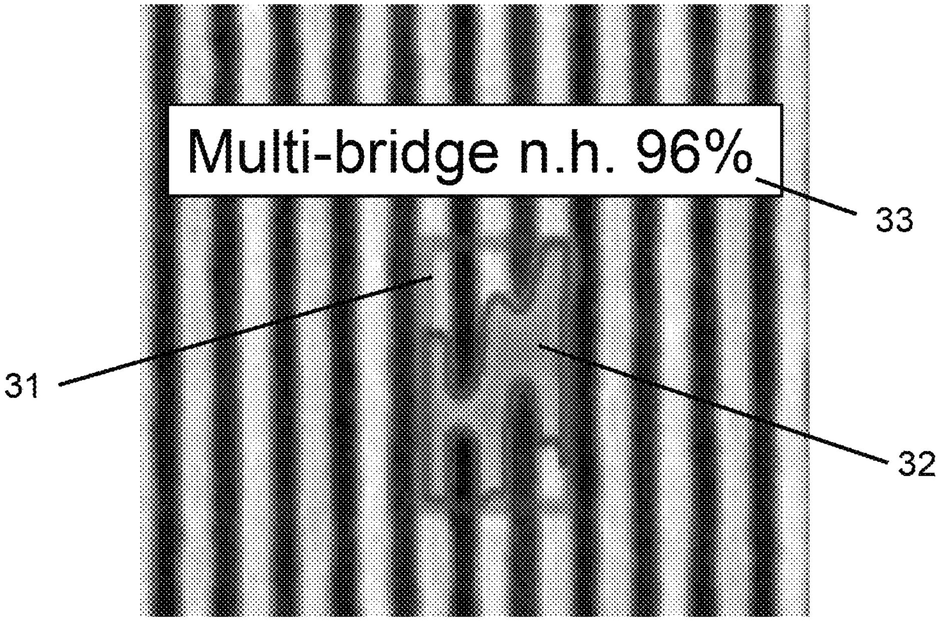
FIG. 3 and FIG. 4 illustrate typical outputs of the trained machine learning model when used for inference according to the disclosed embodiments.

FIG. 3 and FIG. 4 depict typical outputs of the trained machine learning model when used for inference. A test image, e.g. an SEM image of an inspection tool in which potential defects are to be detected, segmented and classified, may be applied as an input to the trained machine learning model. Each selected learning structure proposes predictions for the possible defect candidates, including the defect class, the precise localization of the defect instance relative to the input image (e.g. as indicated via a bounding box), and also the instance segmentation mask. The adopted and optimized ensemble voting scheme may then be applied to generate a final prediction from the plurality of individual predictions as generated by the ensemble of selected learning structures. In the final prediction, it may be decided on the number of defect instances that are detected in the test image, their corresponding classes and precise locations. An instance segmentation mask may be generated for each defect of the final prediction, i.e. corresponding to the segmentation mask predicted by the most confident learning structure (in terms of defect class predictions) at the respective defect location. The final prediction may be presented to the user either in text form, e.g. XML file containing defect instances with annotating labels relating to the defect class, bounding box coordinates and a list or array of Boolean variables for each pixel in the bounding box, which indicate whether the corresponding pixel forms part of the instance segmentation mask, or may be presented visually, e.g. an annotated image file, e.g. annotated CSV file. A visual representation of the final prediction is shown in FIG. 3, where a bounding box 31 delimiting the detected defect in the test image is drawn in addition to an instance segmentation mask 32. A text field 33 may be overlaid with the test image, which presents further details relating to the defect class, e.g. the predicted defect type and the confidence score for this prediction. In the illustrated example, the detected defect is classified as a multi-bridge defect, which is non-horizontal and has obtained a confidence score of 96%. More information in respect of the detected defect could be extracted, for example area of the defect, defect height or width, overall defect density defined as total area of all defects (belonging to all classes or per-class) divided by the total area of the actively processed mask (e.g. resist or etch mask), defect perimeter, defect diameter, and defect polygon shape.

In some example embodiments, the visual representation of the final prediction may be processed to extract and visually present only the instance mask of the defect, i.e. performing background removal in respect of the test image and only use the extracted instance mask as the foreground object. FIG. 4 illustrates a visual representation of a final prediction for a detected line collapse and an instance mask of the identified defect.

The trained and validated machine learning model has been tested on the unseen image data of the test set. Table 1 lists the average precision (AP) for the bounding box regression task and the instance segmentation task in relation to different defect classes (line collapse, single bridge, thin bridge, and non-horizontal multi-bridge). Although a dedicated Mask-R-CNN network has been trained as the learning structure for each defect class when generating the entries of Table 1, the results support that an ensemble of such learning structures may be capable of generalization and can obtain accurate predictions with regard to a variety of defects. The last column of Table 1 indicates the mean average precision across all defect classes.

TABLE 1

Per-class and mean average precision for bounding box and instance segmentation tasks.

| | Line collapse | Single line bridge | Thin line bridge | Multi-line bridge, non-horizontal | Mean |
|---|---|---|---|---|---|
| Bounding box AP | 0.89 | 1.00 | 1.00 | 0.85 | 0.94 |
| Instance segmentation AP | 0.89 | 1.00 | 1.00 | 0.85 | 0.94 |

Figure 5:
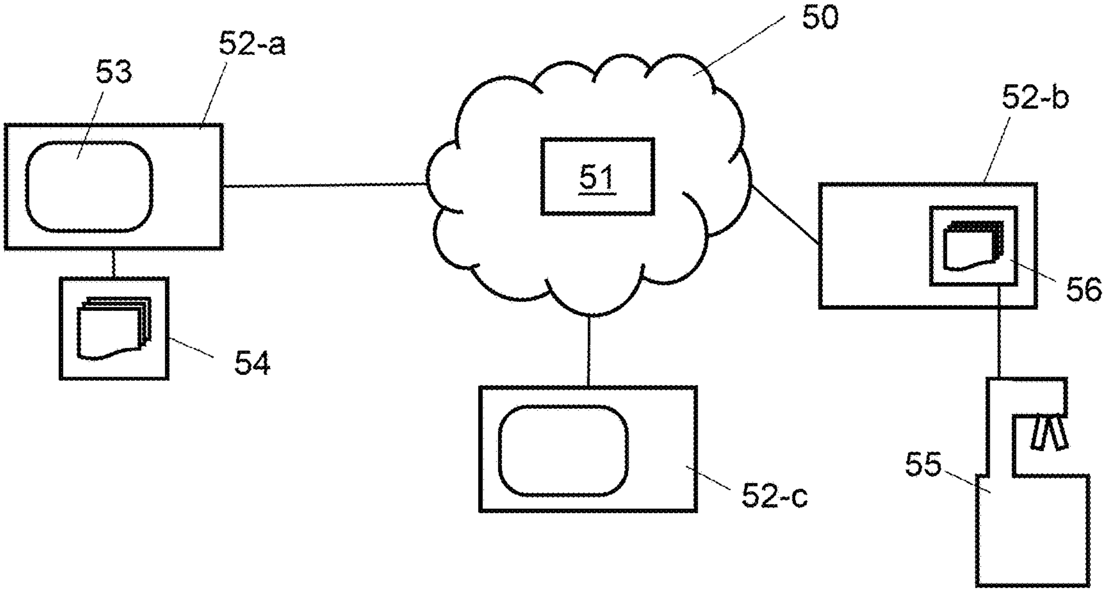
FIG. 5 illustrates a web-based application with communicating client and server units, wherein the server unit stores and executes a machine learning module trained according to embodiments of the invention.

FIG. 5 shows web-based application for defect detection, classification, and instance mask generation. A user provides a number of input images for defect detection and classification on a client device, e.g. one of the client terminals 52*a*-52*c*. These images may correspond to previously generated images that are saved on an external storage unit 54, connected a client device, e.g. client terminal 52*a*. Alternatively, the images may be generated by an imaging apparatus 55, for example a scanning electron microscope, and transferred to an image storage unit 56 of the client device for storage. In some example embodiments, the imaging apparatus itself can be configured as a client device and is containing the image storage unit.

Next, the user determines which ones of the input images are uploaded to a server unit 50 for defect analysis. Here, defect analysis includes performing the joint tasks of defect localization, defect classification and, optionally, defect instance segmentation. The trained machine learning model corresponds to a web-deployed software application 51 that is stored on and executed by the server unit. The server unit may comprise one or more processing nodes, e.g. interconnected processing units. More generally, a network of interconnected and distributed processing nodes may be used instead of a centralized server unit, for instance a distributed server network for cloud-based computation.

The uploaded input images for defect analysis are received by the server unit and applied as inputs to the stored machine learning module in an inference pass. The predicted outcomes of the defect analysis, e.g. defect locations, defect class at each location and optionally the segmented defect instance masks (binary pixel masks), may be compiled into a text-processable format, e.g. an XML file, or may be compiled into a visual representation, e.g. bounding boxes, class labels, and instance segmentation masks annotating the analyzed input image or superimposed with the analyzed input image. Other representations or postprocessing of the output predictions may be adopted if useful, e.g. applying compression algorithms to the text-processable output file formats or output image file formats. The predicted outcomes, or their postprocessed counterparts, may then be sent back from the server to the client device that requested defect analysis.

The web-based application may provide a user interface 53 on the client device, in which the visual representation of the analyzed input image, the input image to be analyzed, or both are displayed. The user interface may allow the user to further modify, clip or edit the visual representation of the analyzed input image, the input image to be analyzed, or both.

In some example embodiments, the defect analysis may comprise an image denoising step. This proves helpful, for example, in situations in which predictions with borderline confidence scores are obtained or in the case of defect types that are difficult to distinguish, e.g. probable gap versus certain gap.

Visual representations of the analyzed image may be divided into a collection of smaller output images, e.g. one output image per located defect. This facilitates the review of automatically detected and classified defects by experts.

In some example embodiments, a processing device that is configured to perform the method steps of the first aspect is disclosed. This processing device may be a general purpose computer, a specially programmed device, e.g. FPGA or GPU, or a special purpose device, e.g. an ASIC.

In some example embodiments, an inspection tool or inspection system that comprises an imaging apparatus and the example processing device described above. The imaging apparatus may be capable of generating images of semiconductor devices under test, e.g. resist masks or etch masks during manufacturing. The imaging apparatus may be an optical microscope or scanner, or a scanning electron microscope. Images of the imaging apparatus may be sent directly or stored and sent later to the processing device for defect analysis, i.e. performing combined defect detection, classification and instance segmentation.

While the various embodiments have been illustrated and described in detail in the drawings and foregoing description, such illustration and description are to be considered illustrative or exemplary and not restrictive. The foregoing description details certain embodiments. It will be appreciated, however, that no matter how detailed the foregoing appears in text, the embodiments may be practiced in many ways.

For example, alternative embodiments may not require a bounding box regressor as a part of the detection module. This is possible, because the segmentation module already has the effect of aligning predictions about the defect segmentation masks with the ground truth segmentation masks in the input images. The defect location being tied to the location of the segmentation mask, the task of predicting the defect location is already solved by the segmentation task, although in an implicit manner. It is possible to derive a bounding box from the predicted mask. This additional information may then be used to annotate the defects in the input image, i.e. completing missing defect location ground truth information, e.g. to provide an improved image dataset. Derived bounding boxes may also be used indirectly by the region proposal module, where it leads to a faster convergence of the region of interest proposal mechanism.

Accordingly, the example embodiment relates to a computer-implemented training method for defect detection, classification and segmentation in image data, wherein the method comprises the steps of:

a) providing an ensemble of learning structures, each learning structure comprising a feature extractor module adapted to generate a feature map from an input image, a region proposal module adapted to identify regions of interest in the input image based on the generated feature map, a detection module adapted to detect defects in each one of the identified regions of interest in the input image and to predict a defect class associated with each one of the detected defects, and a segmentation module adapted to predict an instance segmentation mask for each detected and classified defect in each one of the identified regions of interest in the input image, wherein each feature extractor module comprises a convolutional neural network;
b) individually training each learning structure of said ensemble with a set of training images from an image dataset, wherein images of the image dataset comprise ground truth class labels and at least a subset of the training images comprises ground truth instance segmentation labels in respect of defects contained therein;
c) validating each learning structure of said ensemble with a set of validation images from the image dataset to obtain a prediction score for each learning structure and selecting the learning structures of said ensemble of learning structures whose prediction score exceeds a predetermined threshold score;
d) combining predictions from the selected learning structures of the ensemble of leaning structures, using a parametrized ensemble voting structure, wherein parameters of the ensemble voting structure are optimized on the set of validation images.

Features that have been described with reference to embodiments of the first aspect can also be applied to this alternative method.

The present disclosure is not limited to the disclosed embodiments. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A computer-implemented training method for defect detection, classification and segmentation in image data, the method comprising:

providing an ensemble of learning structures, each learning structure comprising a feature extractor module adapted to generate a feature map from an input image, a region proposal module adapted to identify regions of interest in the input image based on the generated feature map, a detection module adapted to detect defects in each one of the identified regions of interest in the input image and to predict a defect class and defect location associated with each one of the detected defects, and a segmentation module adapted to predict an instance segmentation mask for each detected and classified defect in each one of the identified regions of interest in the input image, wherein each feature extractor module comprises a convolutional neural network;

individually training each learning structure of said ensemble with a set of training images from an image dataset, wherein images of the image dataset comprise ground truth class labels and ground truth locations in respect of defects contained therein, and at least a subset of the training images comprises ground truth instance segmentation labels in respect of defects contained therein, and wherein images of the set of training images are augmented with soft-pixel segmentation labels in respect of defects that are devoid of ground truth instance segmentation labels, wherein the soft-pixel segmentation labels correspond to the instance segmentation masks predicted by the ensemble of learning structures;

validating each learning structure of said ensemble with a set of validation images from the image dataset to obtain a prediction score for each learning structure and selecting the learning structures of said ensemble of learning structures whose prediction score exceeds a predetermined threshold score; and combining predictions from the selected learning structures of the ensemble of learning structures, using a parametrized ensemble voting structure, wherein parameters of the ensemble voting structure are optimized on the set of validation images.

2. The method of claim 1, wherein the ensemble voting structure is configured to perform a weighted average voting with respect to predictions about the defect classes.

3. The method of claim 1, wherein the ensemble voting structure is configured to perform a weighted average voting with respect to predictions about the defect classes.

4. The method of claim 3, further comprising: determining weight parameters for the weighted average voting by a search algorithm or a boosting algorithm.

5. The method of claim 4, wherein the defect location corresponds to a bounding box for the defect and the ensemble voting structure is configured to perform weighted box fusion (WBF) with respect to predictions about the defect bounding boxes.

6. The method of claim 1, wherein the defect location corresponds to a bounding box for the defect and the ensemble voting structure is configured to perform weighted box fusion (WBF) with respect to predictions about the defect bounding boxes.

7. The method of claim 6, wherein the defects are lithography defects of a resist mask and the image data comprises scanning electron microscopy images of said resist mask.

8. The method of claim 1, wherein the defects are lithography defects of a resist mask and the image data comprises scanning electron microscopy images of said resist mask.

9. The method of claim 8, wherein defects include at least one of: line collapse, single line bridge, thin line bridge, or multi-line bridge.

10. The method of claim 8, further comprising: denoising the images of the image dataset.

11. The method of claim 1, further comprising: denoising the images of the image dataset.

12. A computer-implemented method for detecting and classifying defects in image data, comprising the steps of:

providing a machine learning model comprising an ensemble voting structure, optimized according to the method of claim 1, and an ensemble of learning structures, trained and selected according to the method of claim 1; and processing at least one test image with the provided machine learning model to obtain predictions about defect localizations, defect classes and defect instance segmentation masks in said at least one test image.

13. The method of claim 12, further comprising denoising the at least one test image prior to processing it with provided machine learning model.

14. The method of claim 12, further comprising at least one of the following steps:

notifying a user if none of the learning structures of the ensemble of learning structures has been selected;

recommending a user to provide a larger set of training images and/or re-label at least one of the ground truth class labels, the ground truth locations, and the ground truth instance segmentation labels in respect of defects contained in the images of the image dataset, provided that the prediction score is above the predetermined threshold score and below a predetermined target score; and modifying the feature extractor module of at least one learning structure of the ensemble of learning structures, provided the prediction score corresponding to the at least one learning structure is smaller than the predetermined threshold score, and retraining the at least one learning structure with the modified feature extractor module with the set of training images.

15. The method of claim 12, wherein processing at least one test image comprises uploading the at least one test image from a local client unit to a central server unit, applying the provided machine learning model, stored on the server unit, to the at least one uploaded test image, and sending at least predictions about defect localizations, defect classes defect instance segmentation masks in said at least one test image from the server unit back to the local client unit.

16. The method of claim 13, wherein processing at least one test image comprises uploading the at least one test image from a local client unit to a central server unit, applying the provided machine learning model, stored on the server unit, to the at least one uploaded test image, and sending at least predictions about defect localizations, defect classes defect instance segmentation masks in said at least one test image from the server unit back to the local client unit.

17. An inspection system for detecting and classifying lithography defects in resist masks of a semiconductor device under test, the inspection system comprising a scanning electron microscope, and a processing unit, the processing unit being configured to receive image data relating to the resist mask of the semiconductor device under test from the imaging apparatus, wherein the processing unit is programmed to execute the method of claim 1.

18. A data processing device comprising a processor configured to perform the method of claim 1.

19. A computer program comprising instructions which, when the program is executed by a computer, cause the computer to:

provide an ensemble of learning structures, each learning structure comprising a feature extractor module adapted to generate a feature map from an input image, a region proposal module adapted to identify regions of interest in the input image based on the generated feature map, a detection module adapted to detect defects in each one of the identified regions of interest in the input image and to predict a defect class and defect location associated with each one of the detected defects, and a segmentation module adapted to predict an instance segmentation mask for each detected and classified defect in each one of the identified regions of interest in the input image, wherein each feature extractor module comprises a convolutional neural network;

individually train each learning structure of said ensemble with a set of training images from an image dataset, wherein images of the image dataset comprise ground truth class labels and ground truth locations in respect of defects contained therein, and at least a subset of the training images comprises ground truth instance segmentation labels in respect of defects contained therein, and wherein images of the set of training images are augmented with soft-pixel segmentation labels in respect of defects that are devoid of ground truth instance segmentation labels, wherein the soft-pixel segmentation labels correspond to the instance segmentation masks predicted by the ensemble of learning structures;

validate each learning structure of said ensemble with a set of validation images from the image dataset to obtain a prediction score for each learning structure and selecting the learning structures of said ensemble of learning structures whose prediction score exceeds a predetermined threshold score; and combine predictions from the selected learning structures of the ensemble of learning structures, using a parametrized ensemble voting structure, wherein parameters of the ensemble voting structure are optimized on the set of validation images.

* * * * *